United States Patent Office 3,564,050
Patented Feb. 16, 1971

3,564,050
HYDROXY BENZOIC ACID DERIVATIVES
Charles Hoffmann, Enghien-les-Bains, France, assignor to AG. für Chemische und Medizinische Forschung, Lucerne, Switzerland, a corporation of Switzerland
No Drawing. Filed Mar. 3, 1967, Ser. No. 620,222
Claims priority, application Great Britain, Apr. 1, 1966, 14,577/66
Int. Cl. C07c 65/04
U.S. Cl. 260—521    2 Claims

ABSTRACT OF THE DISCLOSURE

Certain derivatives of 4-hydroxy benzoic acid are disclosed having a choleretic action. The most significant compound is 3-(-hydroxypentyl)-4-hydroxy benzoic acid and those related compounds in which the carboxylic acid group can be —COOH— or an alkyl, alkali metal or alkaline earth metal derivative thereof.

This invention relates to new derivatives of 4-hydroxy benzoic acid, to their production and to pharmaceutical compositions containing the same.

According to a first feature of the present invention there are provided 3-(α-hydroxypentyl)-4-hydroxybenzoic acid and its esters and salts, of the Formula I:

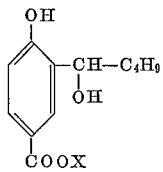

I wherein X represents hydrogen, an alkyl group of 1 to 3 carbon atoms (i.e. methyl, ethyl, propyl or isopropyl), or an alkali metal, alkaline earth metal, ammonium or amine (aliphatic or aromatic) salt-forming cation.

According to a further feature of the invention there is provided a process for the production of the foregoing compounds of Formula I which comprises subjecting to reduction a corresponding ketone of the Formula II:

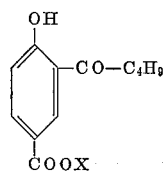

II

The aforesaid process may be carried out catalytically by means of hydrogen under pressure in the presence of Raney nickel or palladium black, or by treatment with an alkali borohydride in a solvent medium. The reduction product is a solid substance soluble in water and in alkaline media.

The ketone of Formula II may be itself obtained by the classic Friedel-Crafts reaction, i.e. by the action of the appropriate acid chloride on an ester of parahydroxybenzoic acid, in the presence of aluminium chloride. It can also be obtained in two stages, by preparing first, in the cold, the phenolic ester by means of the acid chloride, and then subjecting this ester to a Fries re-arrangement. In this case the product obtained is a mixture of the free acid and its ester, thus:

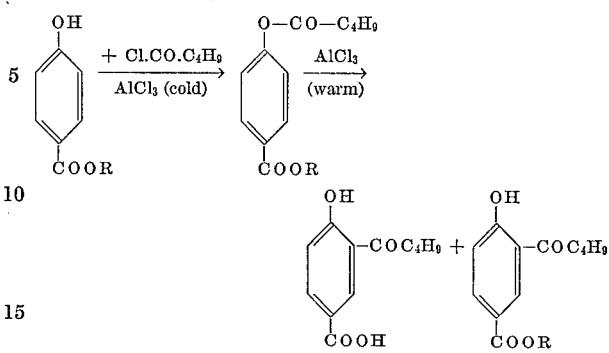

The acid and ester may be separated by making use of their different solubilities in aqueous sodium bicarbonate.

Alternatively the mixture may be treated with warm caustic soda to hydrolyse the ester, thereby to recover the whole product as the sodium salt of the acid, from which the free acid may be obtained.

The following example will serve to illustrate the production of the compounds of this invention:

EXAMPLE (A) Production of 4-n-butylcarboxy benzoic acid methyl ester

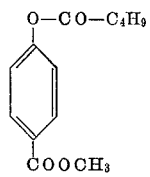

A mixture of:

Tetrachlorethane—50 ml.
Valeroyl chloride—8.5 ml.
Aluminium chloride—19 g.

was cooled to 0° C. and

Methyl p-hydroxybenzoate—10 g.

added in small portions with stirring.

Evolution of HCl immediately occurred.

The mixture was allowed to stand overnight at ambient temperature and then poured onto ice. The tetrachlorethane was decanted, washed with water to neutrality, dried over calcium chloride and the solvent evaporated in vacuo.

The residue was fractionated at 180–183° C. under 15 mm. pressure and yielded 11 g. of colourless product of the foregoing formula, refractive index $n_D^{20} = 1.505$.

The same product was obtained using tin tetrachloride (SnCl₄) as catalyst. In this case the product was distilled at 154° C. under 3 mm. pressure. It had the same refractive index. It was obtained in a yield 90% of theory.

(B) Production of 3-pentanoyl-4-hydroxybenzoic acid

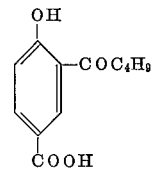

and its methyl ester.

There was introduced into a refrigerated flask:

| | G. |
|---|---|
| Aluminium chloride | 16.9 |
| Ester of (A) above | 10.0 |

The mixture was heated slowly at 120° C. during 30 minutes. Hydrochloric acid gas was evolved. Heating was continued at 160–165° C. for two hours and until the evolution of HCl had ceased.

The mixture was cooled and poured, with stirring, onto a mixture of ice and hydrochloric acid. The solid beige-coloured product which precipitated was filtered off, washed with water and dried. This product consisted of a mixture of the free acid of the foregoing formula, and its ester. These were separated by treatment with aqueous sodium bicarbonate. The product of such treatment was filtered and the filtrate heated with hydrochloric acid. There was thus obtained the acid of the foregoing formula, M.P. (Kofler block) 190° C.

*Analysis.*—Calcd. for $C_{12}H_{14}O_4$ (percent): C, 64.85; H, 6.35. Found (percent): C, 65.18; H, 6.39.

The methyl ester which was simultaneously obtained was recrystallised from methanol and had M.P. 86–87° C.

*Analysis.*—Calcd. for $C_{13}H_{16}O_4$ (percent): C, 66.08; H, 6.83. Found (percent): C, 66.5; H, 6.96.

This ester, on heating with excess 10% by weight caustic soda saponifies very rapidly to yield a free acid M.P. 190° C.

(C) Production of 3-pentanoyl-4-hydroxybenzoic acid methyl ester

To a mixture of:

Methyl p-hydroxybenzoate—76 g.
Valeroyl chloride—61 g.
Tetrachlorethane—750 ml.

was added, little by little, with stirring,

Aluminium chloride—140 g.

The resulting mixture was heated on an oil bath at 130° C. for six hours. After cooling, the mixture was poured onto a mixture of crushed ice and concentrated hydrochloric acid (150 ml.). The organic layer was decanted, washed with water, the tetrachlorethane evaporated and the residue distilled in vacuo.

At 156–158° C. (3 to 4 mm. pressure) there was obtained 85 g. of an oil which crystallised on cooling. The product was recrystallised from a little methanol and had M.P. 86–87° C., being the same ester product as that obtained by method (B) above.

(D) Production of 3-($\alpha$-hydroxypentyl)-4-hydroxy benzoic acid and its methyl ester The compound 3-pentanoyl - 4 - hydroxybenzoic acid methyl ester, prepared as above, dissolved in methanol, was hydrogenated at 50 kg./sq. cm. pressure at 50 to 75° C. in the presence of Raney nickel and palladium black. Absorption of hydrogen is very rapid.

The product was filtered and the solvent evaporated to yield the desired product which after recrystallization from cyclohexane had M.P. 97–98° C. (capillary tube).

*Analysis.*—Calcd. for $C_{13}H_{18}O_4$ (M=238.27) (percent): C, 65.52; H, 7.61. Found (percent): C, 65.91; H, 7.67.

This ester may be hydrolysed by warming with caustic soda and acidifying the product with concentrated hydrochloric acid to yield the free acid.

(E) Production of 3-($\alpha$-hydroxypentyl)-4-hydroxybenzoic acid

To a solution of 9.6 g. of solid NaOH in 400 ml. methanol and 100 ml. water was added 26.5 g. of the ketone, which readily dissolved.

There was then added in small portions, 9.6 g. of sodium borohydride during a period of 70 minutes, with stirring. The stirring was continued for 3 hours and the mixture then allowed to stand overnight. The methanol was then evaporated in vacuo and the residue dissolved in water. To the aqueous solution was added decolourising charcoal and the solution was filtered and acidified to a pH of 1 to 2 by addition of concentrated hydrochloric acid.

The white precipitated product was separated, washed with water and dried in vacuo at 60° C.

The product was thus obtained in a yield of 97%. It had M.P. (instantaneous) 175° C.

*Analysis.*—Calcd. for $C_{12}H_{16}O_4$ (M=224.24) (percent): C, 64.27; H, 7.19. Found (percent): C, 64.22; H, 7.11.

Its acid value corresponded to the theoretical value.

Its sodium salt was obtained by neutralisation of its aqueous solution with the equivalent amount of sodium bicarbonate solution.

Its magnesium salt was obtained by treating the acid in an aqueous medium with the stoichiometric amount of magnesia (MgO) until the latter is dissolved. On evaporation to dryness the magnesium salt is obtained as a crystalline compound of very high water-solubility.

The compounds of the invention have important utility as choleretic agents. Compared with phenyl-1-pentanol the introduction of the indicated further groups on the phenyl nucleus considerably augments the choleretic activity. Moreover the products of the present invention are solids which are more easily handled than liquids.

Pharmacological tests on the compound of the invention, the 3-(alpha-hydroxypentyl)-4-hydroxybenzoic acid, have shown as follows:

A study of the choleretic action on the anaesthetised dog has shown that doses of 150, 100 and even 50 mg./kg. increase considerably the bile flow during at least 3 hours. The elimination of bile constituents increases at the same time, indicating that it is not a matter of simple hydrocholeresis.

Comparison of the product of the present invention with equal doses of phenyl-1-pentanol have shown that administration of the product of the invention to an animal having received in advance a sufficient quantity of phenyl-1-pentanol provokes an increase of the choleresis. By administration of the compounds in the opposite order, i.e. first administering the compound of the present invention and then administering phenyl-1-pentanol, there is no increase in choleresis. It is therefore clear that administration of the compound of the invention achieves a maximum choleresis.

TABLE I.—ACTION OF THE PRODUCT ACCORDING TO THE INVENTION AND OF SOME KNOWN COMMERCIAL PRODUCTS ON CHOLERESIS IN DOGS UPON A FIRST ADMINISTRATION [1]

| 1st Administration | Variation in the mean bile flow, percent | Variation in the maximum bile flow, percent | Variation in the bile concentration rate, percent | Variation in the amount of dry bile material, percent |
| --- | --- | --- | --- | --- |
| Product of the invention 50–100 mg./kg. | [2] +227 | [2] +415 | [3] −41 | [2] +99 |
| Phenyl pentanol 50–150 mg./kg. (I.D.) | +102 | +146 | −44 | +45 |
| Cholic acid 75–100 mg./kg. | +121 | +197 | +120 | +83 |

[1] Conventional method using an extemporaneous biliary fistula applied to dogs (group of 16 dogs) after 15–20 hours fasting, the animals being anaesthetized intramuscularly with Nembutal at a dosage of from 30–40 mg./kg.
[2] Increase relative to the basic value.
[3] Decrease relative to the basic value.

After regularisation of the basic bile flow the product to be tested is slowly injected intravenously (I.V.) or intraduodenally (I.D.). Subsequently the bile is collected until the flow returns to its initial value. Portion of the bile is evaporated with a view of obtaining a dry bile extract.

By means of the product of the invention the mean increase in the bile flow is 227%; maximum bile secretion reaches the value of 415% of the basic value; the bile concentration rate diminishes (−41%), however, the amount discharged is such that the dry material increases by 99%. The product according to the invention increases the secretion of bile and acts as a powerful choleretic agent, whose action is superior to the one of cholic acid and phenyl pentanol.

TABLE II.—ACTION OF THE PRODUCT ACCORDING TO THE INVENTION AND OF PHENYL PENTANOL ON CHOLERESIS IN DOGS UPON A SECOND ADMINISTRATION (SYNERGIC ACTION).[1]

| Second Administration | Variation in the mean bile flow, percent | Variation in the maximum bile flow,[2] percent |
|---|---|---|
| Product according to the invention 75-150 mg./kg., ID or IV | +124 | +203 |
| Phenyl pentanol 50-150 mg./kg., ID | +46 | +117 |

[1] When choleresis is provokes for the second time in the same animals (a first provocation having been effected by means of one of the three products listed in Table I) the product according to the invention, administered intravenously or intraduoden ally at dosages of from 75-150 mg./kg. to a group of 12 dogs, is capable of reproducing a choleretic effect which is clearly superior to the one produced by phenyl pentanol when administered at an identical dosage in an identical manner and under identical conditions.

[2] As compared to the flow measured 15 min. prior to administration.

Tests on the cat and the rat have shown results identical to that obtained by the tests on dogs.

The compound of the invention also possesses a spasmolytic activity. The action of the compound on the isolated duodenum of the rabbit and of the rat provoked a relaxation of the muscle shown by a reduction in amplitude of spontaneous contractions and of intensity of tone. Specifically, the administration of $1 \times 10^{-3}$ of the product accelerated the return to normal of duodenum treated with $0.1 \times 10^{-3}$ barium chloride and even a concentration of $0.5 \times 10^{-3}$ of the product reduced the return to normal by more than 50%. Again, the same dosage of the product reduced the return to normal, by more than 50%, duodenum treated with $1 \times 10^{-5}$ acetylcholine. It is to be noted in this connection that experiments have shown that the return to normal is obtained whether the product is added before or after the spasmogenic agent.

A comparative study with papaverine shows that the product of the present invention has a spasmolytic activity about one twenty-fifth of that of papaverine. Compared with atropine its spasmolytic activity is negligible, showing that the compound, in its activity, more closely resembles papaverine. This spasmolytic activity is of particular value since it avoids the necessity of adding a separate spasmolytic agent as is customary in treatment with choleretic agents.

Tests have shown that the product according to the invention has a slight stimulating effect on the pancreatic secretion of dogs and rats, however, it does not show any effect on the diuresis of dogs, nor on the cardio-vascular and respiratory system of dogs.

The immediate toxicity of the compound, determined on the mouse is $DL_{50}=1.440$ mg./kg. administered orally and 830 mg./kg. administered intraperitoneally. Tests for chronic toxicity, determined on different groups of rabbits and rats have shown that 100 to 300 mg./kg. doses three times a week over 3 months give no ill-effects.

The compound according to the invention equally shows a slight bacteriostatic action on germs found in the biliary ducts, such as staphylococci, streptococci and *Salmonellae typhi*, when used at a concentration rate of $10^4$ μg./ml.

The action of the compound according to the invention has been compared to that of currently used antibiotics which are eliminated through the bile, i.e.: penicillin in the form of sodium benzylphenicillinate, streptomycin in the form of dihydrostreptomycin sulfate, oxytetracycline and sulfamethoxypyridazine.

The comparative tests consisted in inoculating several series of tubes containing ordinary nutrient broth with 24 hours old cultures of staphylococci and Salmonellae, and tubes containing "TRUCHE" broth with 24 hours old cultures of streptococci, the inoculum always containing from $10^4$–$10^6$ bacterial per ml. of the final medium. The product according to the invention and ordinary antibiotics were added at 0 hour and 2, 4 and 6 hours after inoculation. The results obtained are shown in the following tables.

TABLE III.—PATHOGENIC *STAPHYLOCOCCUS AUREUS*
[Lowest inhibitory concentration rates μg./ml.]

| Series, time of growth | Product of the invention | Penicillin | Streptomycin | Oxytetracycline | Sulfamethoxypyridazine |
|---|---|---|---|---|---|
| Hours: | | | | | |
| A, 0 | $10^4$ | 0.6 | $25 \times 10^{-2}$ | $25 \times 10^{-2}$ | $25 \times 10^3$ |
| B, 2 | $10^3$ | 6 | $25 \times 10^{-2}$ | $25 \times 10^{-2}$ | $25 \times 10^3$ |
| C, 4 | $10^4$ | $6 \times 10^2$ | 2.5 | 25 | do |
| D, 6 | $10^4$ | 6 | 250 | 250 | do |

TABLE IV HEMOLYTIC STREPTOCOCCUS
[Lowest inhibitory concentration rate μg./ml.]

| Series, time of growth | Product of the invention | Penicillin | Streptomycin | Oxytetracycline | Sulfamethoxypyridazine |
|---|---|---|---|---|---|
| Hours: | | | | | |
| A, 0 | $10^4$ | 0.6 | 2.5 | $25 \times 10^{-3}$ | $25 \times 10^3$ |
| B, 2 | $10^4$ | 0.6 | 2.5 | $25 \times 10^{-3}$ | $25 \times 10^3$ |
| C, 4 | $10^3$ | 0.6 | $2.5 \times 10^3$ | 250 | ([1]) |
| D, 6 | $10^3$ | 60 | 250 | 250 | do |

[1] Greater than.

TABLE V.—*SALMONELLA TYPHI*
[Lowest inhibitory concentration rate μg./ml.]

| Series, time of growth | Product of the invention | Penicillin | Streptomycin | Oxytetracycline | Sulfamethoxypyridazine |
|---|---|---|---|---|---|
| Hours: | | | | | |
| A, 0 | $10^4$ | 0.6 | 2.5 | 2.5 | $25 \times 10^2$ |
| B, 2 | $10^4$ | 0.6 | 25 | | $25 \times 10^3$ |
| C, 4 | ([1]) | 0.6 | 25 | 250 | $25 \times 10^3$ |
| D, 6 | ([1]) | 0.6 | $25 \times 10^3$ | 250 | do |

[1] Greater than.

It can be derived from the preceding tables that the product according to the invention shows some bacteriostatic activity, although its activity is inferior to that of the currently used antibiotics.

The product according to the invention is thus a powerful choleretic agent which is practically entirely free from toxic reactions, slightly stimulates pancreatic secretion, possesses a spasmolytic activity which is well tolerated and possese an antibacterial activity advantageous in anti-infectious therapy.

The invention further includes therapeutic compositions which contain a compound according to the present invention, together with a pharmaceutically aceptable diluent. This may be liquid, e.g. aqueous, or solid, e.g. the materials such as talc and magnesium stearate commonly employed in the production of pharmaceutical tablets.

VETERINARY FORMULATIONS AND DOSAGE

Gelatinous capsules

| | Mg. |
|---|---|
| Product according to the invention | 100 |
| Excipients: | |
| Corn starch | 10 |
| Magnesium stearate | 2 |

Ampullae

Product of the invention (in the form of a sodium salt) _____ 100 mg./1 ml.

to be administered at a dosage of 3 capsules or ampullae per day.

Clinical tests have equally been effected in order to prove the therapeutic applicability of the compound according to the invention. In addition to its choleretic action, the spasmolytic effect of said product was observable in several patients. The product is furthermore characterized by an excellent general tolerance. Satisfactory results were obtained in the treatment of the following diseases: virus hepatitis, hepatic inadequacies, chronic lithiasis cholecystitis, pre-menopause associated with vesicular attacks and bilious vomit.

I claim as my invention:

1. A derivative of 4-hydroxy bezoic acid of the formula:

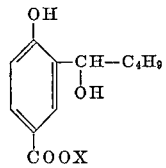

wherein X is hydrogen, alkyl of 1–3 carbon atoms, or an alkali metal or alkaline earth metal.

2. The compound 3-(α-hydroxypentyl)-4-hydroxy benzoic acid.

References Cited

UNITED STATES PATENTS

| 675,544 | 6/1901 | Eichengrun | 260—521 |
| 3,217,033 | 11/1965 | Kollonitsch | 260—515 |

FOREIGN PATENTS

| 641 | 7/1961 | France. |

OTHER REFERENCES

Morrison et al.: Organic Chemistry, 1959 edition, p. 629–630.

Krauch et al.: Organic Name Reactions, pp. 173–4 and 177–8, QD291K7C.3.

Budesinsky et al.: Chemical Abstracts, vol. 49, p. 3879i (1955).

LORRAINE A. WEINBERGER, Primary Examiner

E. J. GLEIMAN, Assistant Examiner

U.S. Cl. X.R.

260—473; 424—308, 317